UNITED STATES PATENT OFFICE.

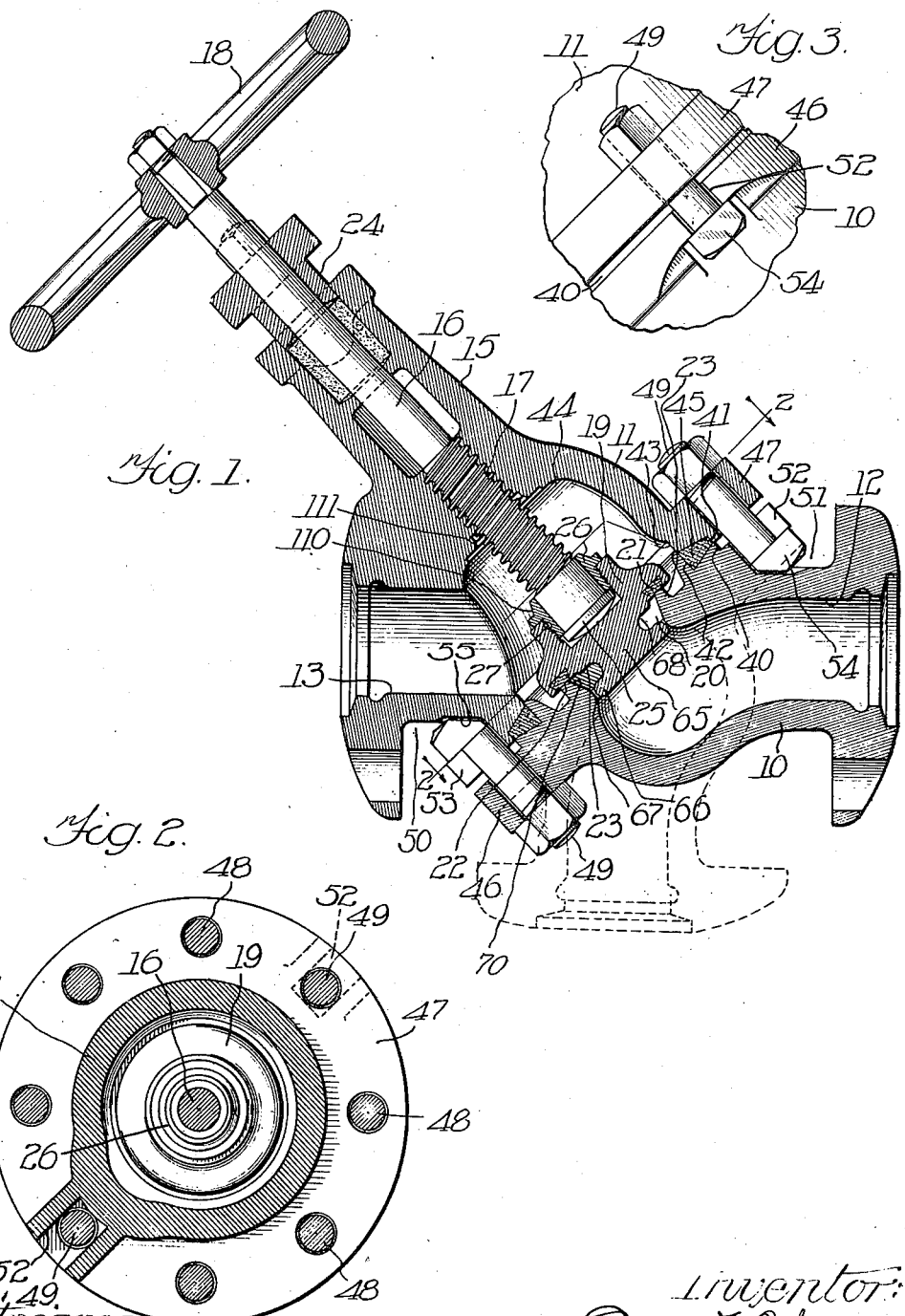

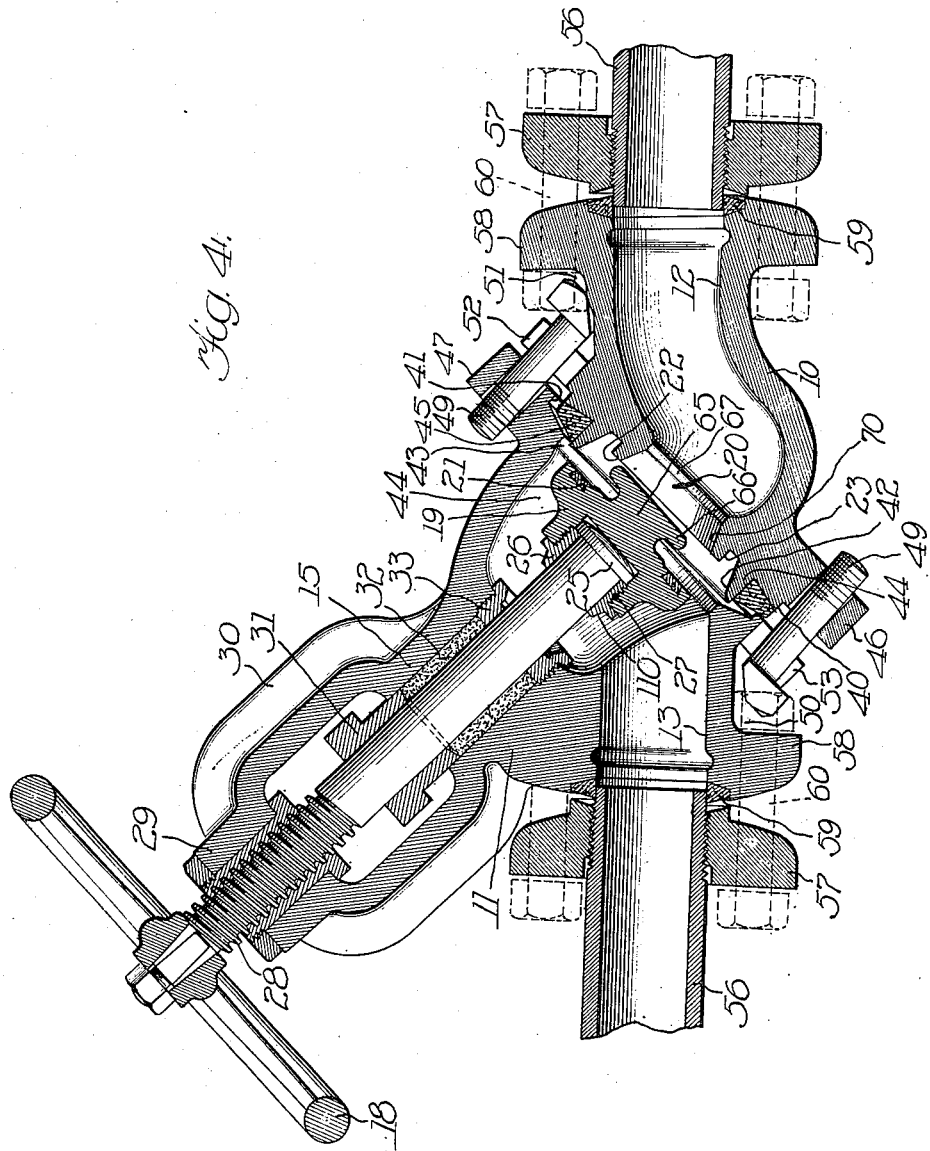

EUGENE F. OSBORNE, OF CHICAGO, ILLINOIS, ASSIGNOR TO OSBORNE STEAM ENGINEERING COMPANY, OF CHICAGO, ILLINOIS, A CORPORATION OF ILLINOIS.

VALVE.

997,693.      Specification of Letters Patent.      Patented July 11, 1911.

Application filed October 1, 1909. Serial No. 520,487.

*To all whom it may concern:*

Be it known that I, EUGENE F. OSBORNE, a citizen of the United States, and a resident of Chicago, in the county of Cook and State of Illinois, have invented certain new and useful Improvements in Valves; and I do hereby declare that the following is a full, clear, and exact description thereof, reference being had to the accompanying drawings, and to the letters of reference marked thereon, which form a part of this specification.

This invention relates to improvements in valves, and refers more specifically to an improved means for attaching together the two parts or members of a two part casing, arranged to facilitate the separation thereof to give access to the interior of the valve.

As shown in the drawing the casing of the valve is of that kind that is designed in one adjustment to be connected in a straight line of piping and in another adjustment to be connected in an angle for use in a deflected line of piping.

The present invention is an improvement on the invention disclosed in my prior United States Letters Patent, Number 670,083, granted March 19th, 1901.

The invention consists in the matter hereinafter set forth and more particularly pointed out in the appended claims.

In the drawings, Figure 1 is an axial section of a valve embodying my invention. Fig. 2 is a transverse section on the line 2—2 of Fig. 1. Fig. 3 is a fragmentary side elevation illustrating the flanges by which the members of the valve casing are bolted together. Fig. 4 is an axial section of the valve, showing its connection in the piping, and the manner of separating the two members of the valve casing, said figure also illustrating a modification of the screw-threaded connection of the valve stem with the valve casing.

The casing of the valve herein shown is composed of two principal parts, to wit, the valve body 10, on which is formed the seat, and the bonnet 11, the former provided with a branched passage 12 for connection with a pipe, and the latter provided with a branched passage 13 adapted for connection with a pipe. The branched passages are generally parallel with each other when the valve is adapted to be connected in a straight line of piping to provide a through valve, as shown in Figs. 1 and 4. It may be converted into an angle valve, as will hereinafter more fully appear. The bonnet is provided with a neck 15 through which extends the valve stem 16 which, as shown in Fig. 1, is screw-threaded at its lower end to engage interior screw threads at the inner end of the bonnet, as shown at 17. The valve stem is provided at its upper end with a hand wheel 18 by which the stem is rotated, and carries at its lower end a swivel piece 19 which is arranged to close the passage 20 that connects one side of the valve to the other; the seating face 21 of the valve piece engaging a seat 22 formed on the valve body and embracing said passage 20. Said seat 22 shown in Fig. 1 is formed on the upper margin of an annular lip 23 surrounding the upper end of said passage 20. A stuffing box gland 24 enters the outer end of the neck around the stem (Fig. 1) and is bolted to the flanged upper end of the neck to compress the packing in the stuffing box about the stem in a familiar manner. The swivel connection of the valve piece to the stem comprises in this instance an upwardly opening recess in the valve piece into which extends the lower headed end 25 of the stem and a nut 26 surrounding the stem and having an annular exteriorly screw-threaded flange which engages interior screw-threads in the recess of the valve piece. The said nut is locked to the valve piece by a pin 27.

In the form of valve shown in Fig. 4 the screw-threaded portion 28 of the stem is at the outer end thereof and engages an interiorly screw-threaded nut 29 carried by a yoke 30 made integral with the valve bonnet. In the latter construction the stuffing box which provides a fluid tight joint about the stem is arranged between the screw-threaded portion of the stem and the valve piece. Said stuffing box embraces a gland 31 which is bolted to the bonnet and extends into the packing recess 32 of the stuffing box to compress the packing between the same and bottom 33 of said recess which, in this instance, comprises a screw-threaded ring.

The meeting ends of the body and bonnet are inclined at an angle of substantially forty-five degrees and the meeting end faces of said members are provided with mutually interfitting, concentric, annular offsets adapted to hold the parts laterally in place with respect to each other. As herein shown the body 10 is provided at its end face with an annular shoulder 40 which fits within a corresponding annular shoulder 41 at the end face of the bonnet. The body 10 is additionally provided at some distance radially inside of, and concentric with the shoulder 40, with an annular flange 42 which extends into the cylindric opening 43 of the chamber 44 of the bonnet which receives the valve swivel piece. This additional flange 42 has special utility in a valve which is designed to be subjected to high pressure, said flange constituting the inner annular wall of a packing chamber to receive an annular packing ring 45 that is interposed between the two members of the valve casing, the outer side wall of which chamber is formed by the annular shoulder 41. Said packing ring is made of any suitable hardened material, depending upon the service to which the valve is to be put. The proximate faces of the casing members at the packing chamber are inclined to fit the correspondingly inclined end faces of the packing ring. The packing ring is thus inclosed on all sides by metal walls and when the casing members are clamped together the ring is compressed to completely fill the chamber and to be pressed closely on the flange 42 to avoid leaking around the same. The two parts or members of the valve casing, to wit, the body 10 and bonnet 11, are provided with radial overlapping flanges 46, 47, respectively, which are provided with registering openings through which fastening bolts 48, 49 extend, and by which the said casing members are clamped or bolted together.

The construction described permits the casing members to be rotated one relatively to the other about the axis of the valve stem, when the bolts are removed, to arrange the inlet and outlet branches generally parallel with each other, as shown, for introduction of the valve in a straight line of piping, or at right angles to each other, as indicated by dotted lines in Fig. 1 as required to connect the valve in a right angle of a deflected line of piping.

One of the features of the invention relates to the provision of means for fastening the flanged members of the casing together wholly by the use of bolts and without the use of studs, such as has heretofore been used at the parts of the casing adjacent to the branched passages of the valve, and to provide an arrangement of the bolts and flanges at the latter locations which will admit of the ready separation of the casing members without removing the valve from the piping line or disturbing the piping line to any considerable extent. The bolts 48 which extend through the plate portions of the flanges at the sides of the branches 12 and 13 may be readily removed by removing their nuts. The bolts 49, however, in line with said branches have not sufficient clearance to be removed in the manner of the bolts 48 and, heretofore, it has been the practice to use studs at these points, which are screw-threaded to one flange and extending through the other flange and provided at their free screw-threaded ends with nuts, as shown in my aforesaid prior Patent No. 670,083. When so connected, it is obviously necessary to move one of the casing members away from the other member, in the line of the axis of the valve stem, a distance to clear the entire length of the studs, and this, in practice, has required the loosening or easing of the pipe joints for a considerable distance at each side of the valve in the piping line, or the entire removal of the valve, thus entailing a great amount of work and time to separate the valve members in order to gain access to the interior of the casing and the parts therein. Moreover, the stud bolts corrode and stick in the flanges and are not easily removed.

In order to overcome the difficulties hereinabove mentioned with respect to separating the casing members, the two members are recessed above and below the branches 12 and 13 respectively, between said branches and the bolt flanges, and as indicated at 50 and 51, adjacent to the heads of the bolts 49, 49, and the adjacent sides of the flanges are likewise recessed as shown at 51ª so as to provide easy clearance for said latter bolts. The flanges 46, 47 of the casing members next adjacent to said branches and the recesses 50 and 51 are slotted as indicated at 52, 53 to receive the bolts 49, the slot 52 being formed in the lower flange and the slot 53 in the upper flange. The upper and lower flanges opposite to said slots are provided with round holes through which said bolts 49 extend. One of the bolts 49 is inserted upwardly through the slot 52 in the lower flange and corresponding hole in the upper flange, while the other bolt 49 is inserted downwardly through the slot 53 in the upper flange and the registering hole in the lower flange. The heads 54, 55 of the bolts 49 are shortened or cut away on their inner sides so as not to extend inwardly beyond the shanks of said bolts. This arrangement permits the shanks of the bolts 49 to lie closely against the bottoms of the slots 52 and 53 and in the circle of the bolts 48 as indicated in Figs. 1 and 2.

The valve is shown in Fig. 4 as connected in a line of piping 56 by means of joints consisting of flanges 57, 57 screw threaded to the pipes, between which and the flanged ends 58 of the branches, into which the pipes enter, are compressed packing rings 59 that surround the pipe ends, said flanges being drawn together by bolts 60, indicated in dotted lines in Fig. 4.

When it is desired to separate the casing members to gain access to the interior of the valve casing, the screw-threaded flanges 57 may be backed away from the flanged ends of the branches, the bolts being first removed. Thereafter the bolts 48 are removed and the nuts are removed from the bolts 49. Thereafter the lower casing member or valve body is swung downwardly until the shoulder 40 and the flange 42 on the lower member of the valve casing are free from their corresponding interfitting shoulders 41 and 43, this being permitted by reason of the flexibility of the packing joints and also of the slight looseness of fit of the bolts 49 in their holes in the flanges 46 and 47. After the interfitting shoulders have thus been freed from each other, the lower casing member or the valve is free to drop downwardly to and below the position indicated in Fig. 4; the slotted openings 52 and 53 of the flanges, engaged by the heads of said bolts, permitting the headed ends of said bolts 49 to pass outwardly to the outer ends of the slots, the bolt 49 associated with the slot 53 being carried outwardly by its engagement with the lower flange 46, and the bolt 49 associated with the slot 52 being held substantially fixed while the slotted portion of the flange 46 passes over the bolt. The bolts are now in position to be removed comparatively easily from the flanges to permit the casing members to be swung laterally away from each other to gain access to the interior thereof. In this manner the headed ends of the bolts are freed from the slotted flanges so that they may be readily removed with a comparatively small movement of the casing parts or members and with a correspondingly small disturbance of the piping line, thereby decreasing the time and labor required to gain access to the interior of the valve.

The seating face of the valve piece is herein shown as formed by a soft metal ring 21 which is wholly or partially inserted or embedded in an annular groove in the lower face of the valve piece. As herein shown the face ring is flush with the lower face of the valve piece and the groove is of triangular cross section to hold the face ring in place. The face ring is made somewhat wider at its lower side than the body seat 22 so that upon wear of the face ring the valve piece will follow such wear in a manner to insure a close fit of the face ring and seat.

The said swivel valve piece shown in Figs. 1 and 4 is provided with an integral projection 65 which extends downwardly into the passage 20 a distance below the valve seat 22 when the valve is closed. The projection is provided at its lower end with an annular flange 66 which closely fits a restricted portion 67 of the passage 20. Said restricted portion constitutes the smallest diameter of said passage and is located a distance below the plane of the valve seat somewhat less than the distance between the plane of the seating face of the valve piece and the plane of the flange 66 or enlargement 66 of said projection. The said flanged portion of the projection fits closely in the restricted portion of the passage when the valve is closed, the flanged portion entering said restricted portion of the passage before the valve piece is seated and leaving the said restricted passage after the valve piece has been lifted a substantial distance from its seat. Thus when the valve piece is removed only a short distance from the valve seat, either when the valve is being opened or closed, the area between said projection and the restricted wall of the passage is so much smaller than that between the valve piece and the valve seat that the flow of the fluid will be slow through the larger area, as compared to the smaller area, and the projection of the valve piece and surrounding wall of the restricted passage will receive substantially all the wear due to the high velocity of the fluid passing through the valve. Preferably there is provided between the valve seat and the restricted portion of the passage an equalizing chamber 68, which may be formed above the flanged or enlarged part of the projection 65 or which may be augmented or wholly formed by tapering outwardly or enlarging the wall of the passage above the restricted part thereof as indicated at 70. The presence of such chamber operates to equalize the pressure across the valve seat and the face of the valve piece when the valve piece is removed a distance away from its seat, and while the projection 65 is still within the restricted portion of the passage 20, thus wholly throwing the wear, due to the wire drawing action of the fluid, on the projection and the wall of the passage surrounding the same.

By reason of the fact that the projection 65 is an integral part of the valve piece, the valve piece, as a whole, may be readily and economically made and there are no loose parts which are likely to become deranged or to change the relative distance between the larger part of the projection and the seating face of the valve piece. The said projection is preferably hardened so as to resist the wear due to the wire drawing action of the fluid and the wall of the passage which surrounds said projection may be likewise hardened or formed on a removable hardened piece or ring.

It will be understood the various structural details herein illustrated and described may be somewhat varied and the invention is not limited to such details except as hereinafter made the subject of specific claims.

I claim as my invention:

1. A valve casing comprising two members, each provided with a tubular branch, the ends of said members meeting in a plane oblique to the axes of said branches and provided at their meeting ends with packing recesses with a packing therein to produce a fluid tight joint, said members being provided at their margins with flanges having bolt openings, and bolts extending through said bolt openings, one bolt opening of each flange, opposite to its branch being slotted outward to the margin of the flange and the corresponding opening of the other flange being unslotted, and the slotted openings of the two flanges being on opposite sides of the meeting plane of the members.

2. A valve casing comprising two members, each provided with a tubular branch, the ends of said members meeting in a plane oblique to the axes of said branches and provided at their meeting ends with packing recesses with a packing therein to produce a fluid tight joint, said members being provided at their margins with flanges having bolt openings, and bolts extending through said bolt openings, one bolt opening of each flange, opposite to its branch being slotted outward to the margin of the flange and the corresponding opening of the other flange being unslotted, and the slotted openings of the two flanges being on opposite sides of the meeting plane of the members, said casing members being cut away or recessed between the flanges and the branches to provide clearance for the bolts at these points.

3. A valve casing comprising two members, each provided with a tubular branch, the ends of said members meeting in a plane oblique to the axes of said branches and provided at their meeting ends with packing recesses with a packing therein to produce a fluid tight joint, said members being provided at their margins with flanges having bolt openings, and bolts extending through said bolt openings, one bolt opening of each flange, opposite to its branch being slotted outward to the margin of the flange and the corresponding opening of the other flange being unslotted, and the slotted openings of the two flanges being on opposite sides of the meeting plane of the members, said casing members being cut away or recessed between the flanges and the branches to provide clearance for the bolts at these points, and the heads of the latter bolts being cut away at their inner sides substantially to the shanks of the bolts.

In testimony, that I claim the foregoing as my invention I affix my signature in the presence of two witnesses, this 15th day of September A. D. 1909.

EUGENE F. OSBORNE.

Witnesses:
W. L. HALL,
GEORGE R. WILKINS.